US012730701B2

(12) United States Patent
Suda et al.

(10) Patent No.: US 12,730,701 B2
(45) Date of Patent: Sep. 8, 2026

(54) SYSTEMS, METHODS, AND SOFTWARE FOR EVENT DETECTION AND PROVISION OF NOTIFICATIONS TO CLIENT DEVICES

(71) Applicant: THE BANK OF NEW YORK MELLON, New York, NY (US)

(72) Inventors: Venkata R. Suda, New York, NY (US); Anil Vellala, New York, NY (US); Amit Singh, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 108 days.

(21) Appl. No.: 18/771,478

(22) Filed: Jul. 12, 2024

(65) Prior Publication Data

US 2026/0017130 A1 Jan. 15, 2026

(51) Int. Cl.
*G06F 11/07* (2006.01)

(52) U.S. Cl.
CPC ........ *G06F 11/079* (2013.01); *G06F 11/0709* (2013.01)

(58) Field of Classification Search
CPC ........................... G06F 11/079; G06F 11/0709
See application file for complete search history.

(56) References Cited

PUBLICATIONS

Pulsar ("A Crash Course in Distributed Pub-Sub Messaging with Apache Pulsar," 2022) (Year: 2022).*
Hexnode ("What is Apple Push Notification Service (APNs)," 2021) (Year: 2021).*
Fullstory ("Predicting customer behavior with data," 2024) (Year: 2024).*
Holdsworth ("What is NLP (natural language processing)?", IBM, 2020) (Year: 2020).*
Pulsar ("Message Retention and Expiry," Cookbooks, Pulsar 2.2.0, 2018) (Year: 2018).*

* cited by examiner

*Primary Examiner* — Ashish Thomas
*Assistant Examiner* — Kayo Lisa Rusin
(74) *Attorney, Agent, or Firm* — Pillsbury Winthrop Shaw Pittman, LLP

(57) ABSTRACT

Disclosed are systems, software, and methods for providing event-based notifications to client devices. One system for such includes memory storing computer program instructions and one or more processors configured to execute the computer program instructions. The instructions cause operations that include receiving, at a gateway service module from an event-originating application, an event data packet comprising event information about an event. The gateway service module provides event information to an event-processing module. The event-processing module generates an event notification based at least on the event information. The gateway service module initiates a push notification to a client device that includes the event notification and instructions to display the event notification at the client device.

19 Claims, 8 Drawing Sheets

SYSTEMS, METHODS, AND SOFTWARE FOR EVENT DETECTION AND PROVISION OF NOTIFICATIONS TO CLIENT DEVICES

DESCRIPTION OF THE RELATED ART

Users of computer systems typically have many tools and dashboards they need to interact with on a daily basis to understand the status of applications and systems as well as personnel compliance areas. Often it is up to the user to actively manage deadlines, alerts, and events that may be present on these disparate interfaces. A user's failure to do so may result in missing important deadlines or tasks that require their attention or action, resulting in delays, penalties, or missed opportunities. Also, the user may not be aware of the status or progress of their incidents, approvals, or issues, and may not be able to follow up or escalate them in a timely manner. Additionally, the user may not receive timely alerts or notifications about application performance metrics, failures, threshold breaches, or other events that may affect their work or business continuity. Due to the limitations present in current systems, the user may not receive proactive recommendations or solutions for resolving or preventing application failures, issues, or errors, and may have to rely on manual troubleshooting or external support. As a result, users may experience lower productivity, efficiency, and satisfaction, as they have to spend more time and effort on managing their tasks, approvals, incidents, issues, and failures, rather than focusing on their core work or goals.

SUMMARY

Disclosed are systems, software, and methods for providing event-based notifications to client devices. In one aspect, a system includes memory storing computer program instructions and one or more processors configured to execute the computer program instructions. The instructions cause operations that include receiving, at a gateway service module from an event-originating application, an event data packet comprising event information about an event. The gateway service module provides event information to an event-processing module. The event-processing module generates an event notification based at least on the event information. The gateway service module initiates a push notification to a client device that includes the event notification and instructions to display the event notification at the client device.

In some embodiments, the event-originating application may be a ticketing service, a scheduling service, an application datacenter failover service, an event management service, or a fault monitoring service. The event information may include one or more of an outstanding request, a scheduled activity, or a hardware or software fault. The operations may include displaying of the event notification at the client device by generating a graphical indication on a screen of the client device that is visible to a user.

In some embodiments, the gateway service module may include a gateway logging module, a gateway messaging bus, and a gateway lookup module. The operations may include providing, from the event-originating application to the gateway logging module, the event data packet; providing, to the gateway messaging bus from the gateway logging module, the event information; and providing, by the gateway messaging bus to the gateway lookup module, the event information at a first periodic interval. The first periodic interval may be 10 seconds.

In some embodiments, the operations may include pulling, from the event-originating application, an outstanding task present in a task queue stored in computer memory; and providing the outstanding task to the gateway logging module as an event data packet. The pulling and the providing may be based on user preferences stored in a first database. The operations may include obtaining user input providing user preferences and storing the user preferences in the first database. The user preferences may be queried from the first database at a second periodic interval to establish permission to perform the pulling and the providing of the outstanding task. The second periodic interval may be three times a day.

In some embodiments, the operations may include logging the event information at a second database.

In some embodiments, the operations may include deleting, at a third periodic interval, the event information stored at the gateway messaging bus. The third periodic interval may be twice per day.

In some embodiments, the operations may include querying, by the gateway lookup module to the gateway messaging bus, for the event information at the first periodic interval; and providing the event information to the event-processing module. The operations may include providing the event notification and instructions in a predetermined format according to the event information.

In some embodiments, the operations may include providing the event information to a machine-learning model; determining, by the machine-learning model and based at least on the event information, an action a user may take to handle the event; and displaying, at the client device, a graphical representation of the action. The machine-learning model may be located at least partially on the client device.

In some embodiments, the operations may include receiving text-based input from a user of the client device relating to the event; and processing the text-based input by a natural language processing module to generate an input for the machine-learning model. The natural language processing module may be located at least partially on the client device.

Implementations of the current subject matter may include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also contemplated that may include one or more processors and one or more memories coupled to the one or more processors. A memory, which may include a computer-readable storage medium, may include, encode, store, or the like, one or more programs that cause one or more processors to perform one or more of the operations described herein. Computer implemented methods consistent with one or more implementations of the current subject matter may be implemented by one or more data processors residing in a single computing system or across multiple computing systems. Such multiple computing systems may be connected and may exchange data and/or commands or other instructions or the like via one or more connections, including but not limited to a connection over a network (e.g., the internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Conventional software applications used in many workplaces require a user to independently monitor outstanding tasks or deadlines. Also, even when a user is aware of an event or issue that needs attention, conventional systems may fail to provide useful instructions in resolving the event or issue. The present disclosure provides systems and software that improves upon the state-of-the-art by, for example, automatically monitoring the progress of ongoing tasks and tracking new tasks based on events (e.g., tasks, system errors, etc.) initiated by external systems. Also, the present disclosure provides software solutions that leverage generative artificial intelligence (also referred to herein as machine-learning (ML)) and natural language processing (NLP) in providing more accurate and understandable instructions to a user based on the particular event provided as input to the software.

Figure 1:
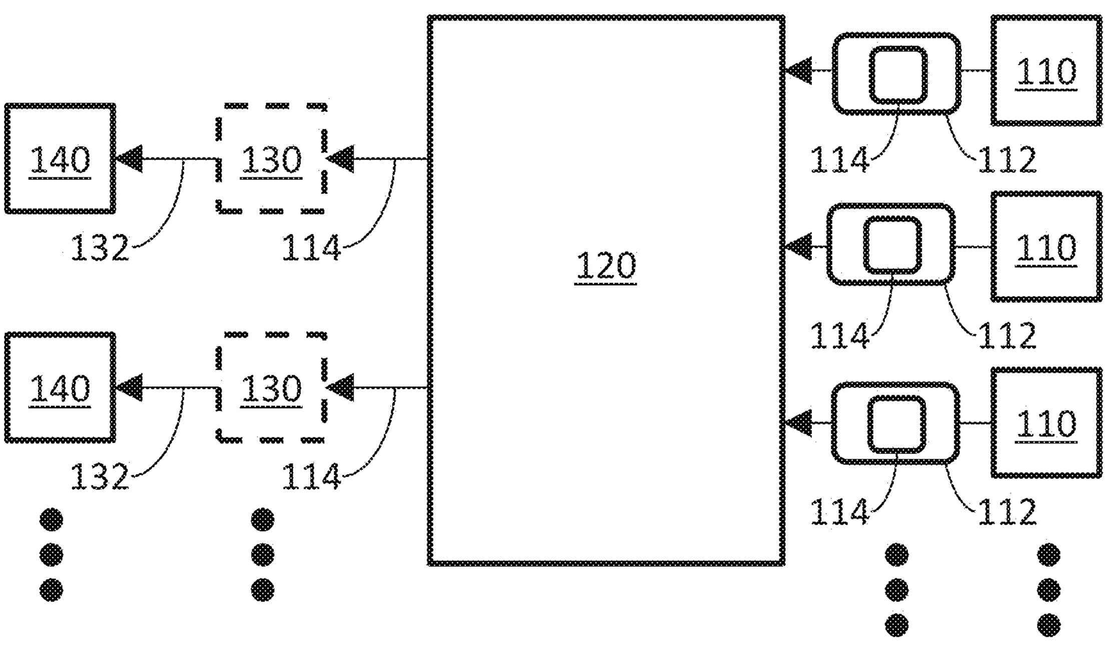
FIG. 1 is a block diagram of an example system architecture for providing event-based notifications, in accordance with certain aspects of the present disclosure.

FIG. 1 is a block diagram of an example system architecture for providing event-based notifications. The depicted example illustrates possible hardware and software structure for one embodiment of the present disclosure. In one embodiment, the system may include event-originating application 110 generating event data packet 112 that includes event information 114. Event-originating application 110 may be, for example, a ticketing service, a scheduling service, an application datacenter failover service, an event management service, a fault monitoring service, etc. Event information 114 may include, for example, one or more of an outstanding request, a scheduled activity, a hardware or software fault, etc. The system may automatically detect user device information and/or information about an event-originating application (e.g., which e-mail program, scheduling program, operating system, etc.). This information may be utilized as input into the analysis/decision code (e.g., a ML program) that determines how to display the event information to the user and provides suggestions on resolution. In some embodiments, event-originating application 110 may include an application that monitors and analyzes performance metrics, failures, threshold breaches, and/or other events. The system may then proactively alert and assist the user with one or more models, such as root cause analysis, impact assessment, failover planning, etc.

Event data packet 112 may be processed by gateway service module 120 to generate event information 114 for event-processing module 130. Event data packet 112 may be, for example, a data packet utilizing JavaScript Object Notation (JSON) to facilitate interaction of gateway service module 120 to a wide variety of event-originating applications 110 that may be configured to generate event data packets 112 in the JSON format. Event-generating applications may be configured to provide information about the event in a particular format, which may then be included in event data packet 112. Event data packet 112 may include, for example, system type (for the event initiating application), event (e.g., an identifier for a given event type), event title, event description, a URL with more information (e.g., which may be provided to a user of a client device), etc.

Details of various embodiments of the gateway service module 120 are described further herein, but, for example, gateway service module 120 may process incoming event data packets 112 based on user preferences and provide needed information to event-processing module 134 for generating useful notifications to the user. Event-processing module 130 may then generate event notification 132 and provide it to client device 140. Event-processing module 130 may include, for example, a natural language processing module and/or generative AI module to generate event notification 132 in a way that is understandable by a user, and also provides an accurate and efficient solution path for the event. Event-processing module 130's primary function may be to provide a rapid summary of event content, identify root cause, highlight action items, and gauge sentiment. Event-processing module 130 may receive actual event information and knowledge base info to determine actual root causes and/or recommended remediations.

In some embodiments, event-processing module 130 may reside at gateway service module 120. However, in other embodiments, event-processing module 130 may reside at client device 140. In yet other embodiments, event-processing module 130 may reside at another computing system and/or be distributed across multiple computing systems. For example, in embodiments where event-processing module 130 comprises a machine-learning module and a natural language processing module, the machine-learning module may reside at gateway service 122 take advantage of improved processing capabilities of a centralized computing system. The natural language processing module may then reside at client device 140 to facilitate substantially lag free interaction with a user of client device 140 (e.g., without the lag that would be present were it necessary to communicate with a remote computer or server).

Figure 2:
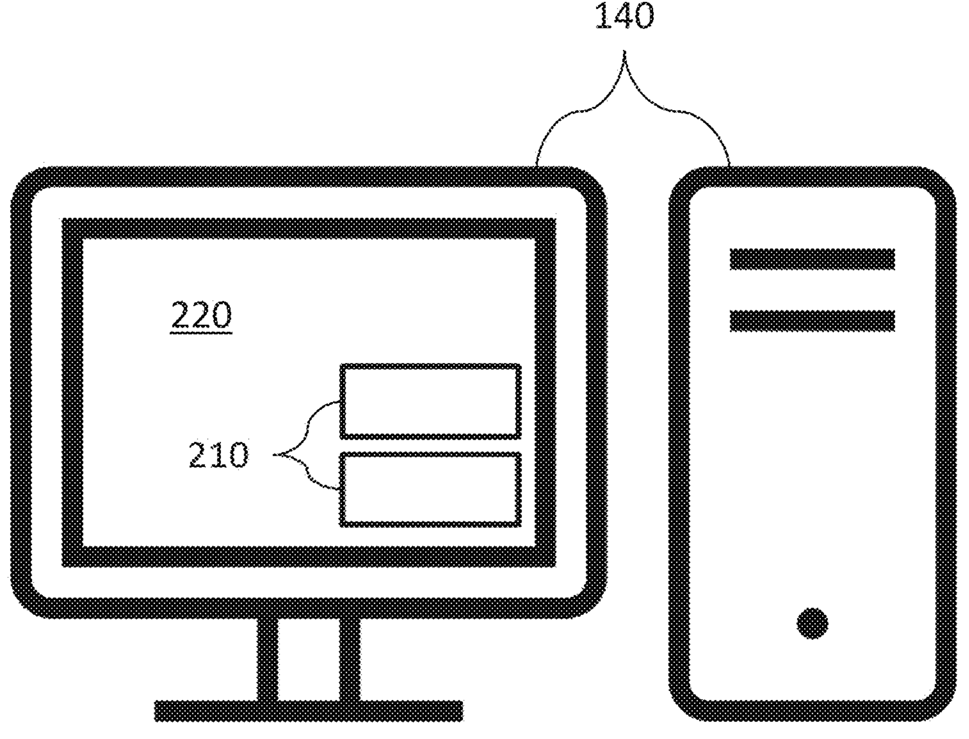
FIG. 2 is a diagram illustrating an example event notification displayed at a client device, in accordance with certain aspects of the present disclosure.

FIG. 2 is a diagram illustrating an example event notification displayed at a client device. In some embodiments, the disclosed processes may include displaying event notification 132 at client device 140 by generating a graphical indication 210 on a screen 220 of client device 140 that is visible to a user. Graphical indication 210 may be, for example, a pop-up window, a banner that emerges from a boundary of the screen or of a related application, etc. In some embodiments, graphical indication 210 may include an event identifier (e.g., a simple identification of the event such as a deadline, a specific computer fault, etc.). Graphical indication 210 may also include information about how to address the event. The information may include text providing instructions or suggestions, hyperlinks to support pages, or allowing initiation of corrective action such as by executing troubleshooting applications or an application related to the instant event. For example, if the event is a reminder to review/approve for a particular task, a hyperlink may initiate generation of a dashboard/form for the user to complete the task. Graphical indication 210 may include providing a hyperlink to complete the task, another hyperlink to see more details, etc.

Figure 3:
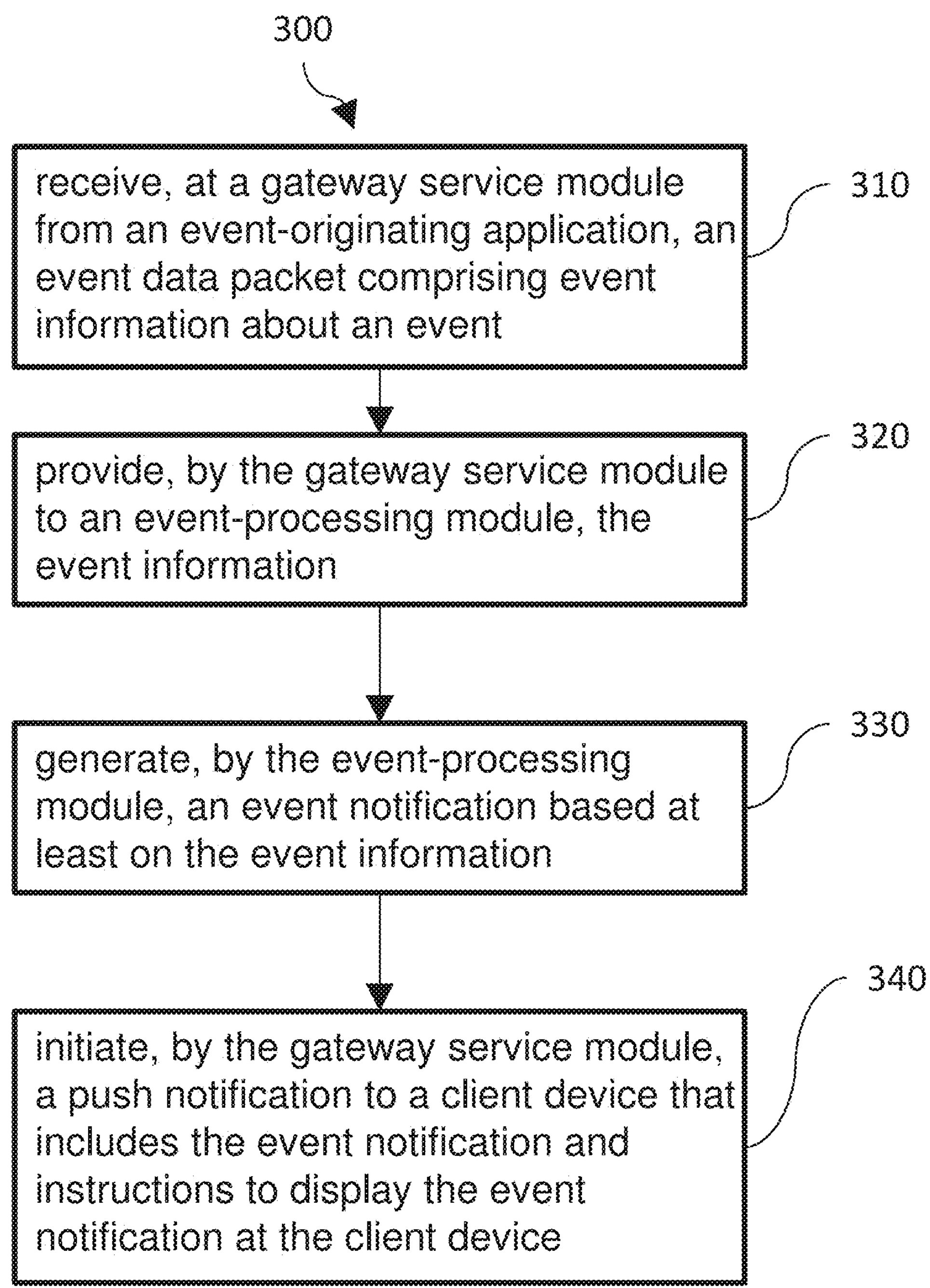
FIG. 3 is a flow chart for an example method of generating and displaying an event notification, in accordance with certain aspects of the present disclosure.

FIG. 3 is a flow chart for an example method of generating and displaying an event notification. In one embodiment, program flow 300 may include, at 310, receiving, at gateway service module 120 from event-originating application 110, an event data packet 112 comprising event information 114 about an event. At 320, the flow may include providing, by gateway service module 120 to event-processing module 130, event information 114. At 330, the flow may include generating, by event-processing module 130, event notification 132 based at least on event information 114. At 340, the flow may include initiating, by gateway service module 120, a push notification to client device 140 that may include event notification 132 and instructions to display event notification 132 at client device 140.

Figure 4:
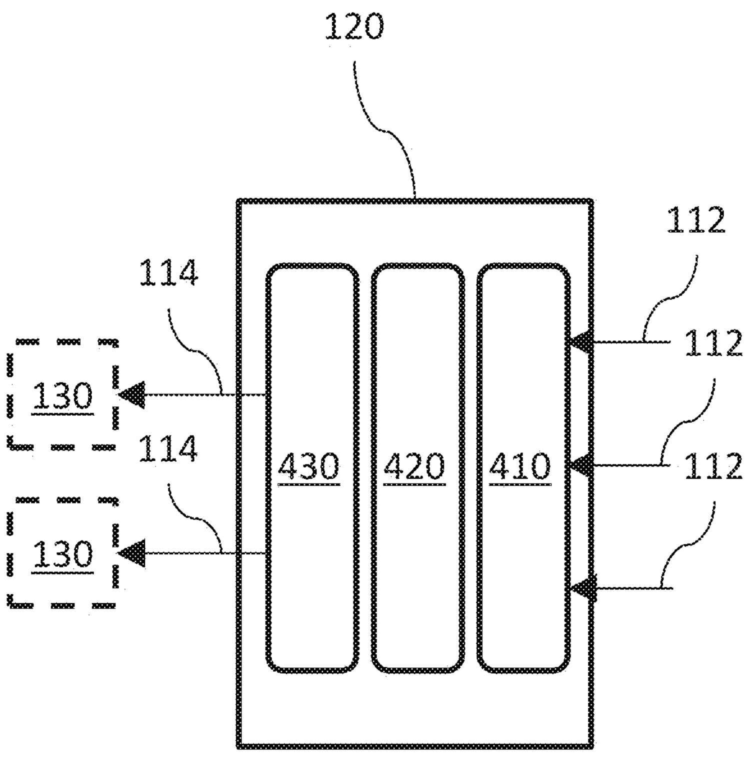
FIG. 4 is a block diagram of an example gateway service module architecture, in accordance with certain aspects of the present disclosure.

FIG. 4 is a block diagram of an example gateway service module architecture. In one embodiment, gateway service module 120 may include gateway logging module 410, gateway messaging bus 420, and gateway lookup module 430. In such embodiments, the program flow may further include, for example, providing, from event-originating application 110 to gateway logging module 410, event data packet 112. When an event is generated from event-originating application 110, such as a System Fault event, it may be forwarded to gateway logging module 410. Gateway logging module 410 may interpret the incoming event in JSON format and record the event details in a structured database, marking the status as "not delivered." After the event information is stored in the database, the event may be transmitted to gateway service module 120, which queues incoming events. Gateway lookup module 430 may continuously (or at regular intervals) scan for events in gateway messaging bus 420. Upon detecting an event, gateway messaging bus 420 may identify the recipient and locate the recipient's desktop IP address. Gateway lookup module 430 may then send the event information to the recipient's desktop (or other client device 140) via TCP protocol and update gateway logging module 410 with the status. If the event is successfully dispatched to the recipient's desktop, the status may be updated to "success;" if not, may be marked as "failed." The flow may also include providing, to gateway messaging bus 420 from gateway logging module 410, the event information 114. In some embodiments, gateway messaging bus 420 may be a distributed system including servers and clients that communicate via a high-performance TCP network protocol. The flow may also include providing, by gateway messaging bus 420 to gateway lookup module 430, event information 114. Providing event information 114 may occur substantially continuously or instantly upon receipt of event data packet 112 (e.g., with little to no delay other than required processing time) or may occur at a first periodic interval. In some embodiments, the first periodic interval may be is, 5 s, 10 s, 30 s, 1 min, 1 hr, etc. such a time interval may provide, for example, a user (or system) definable time to display notifications at the client devices.

Figure 5:
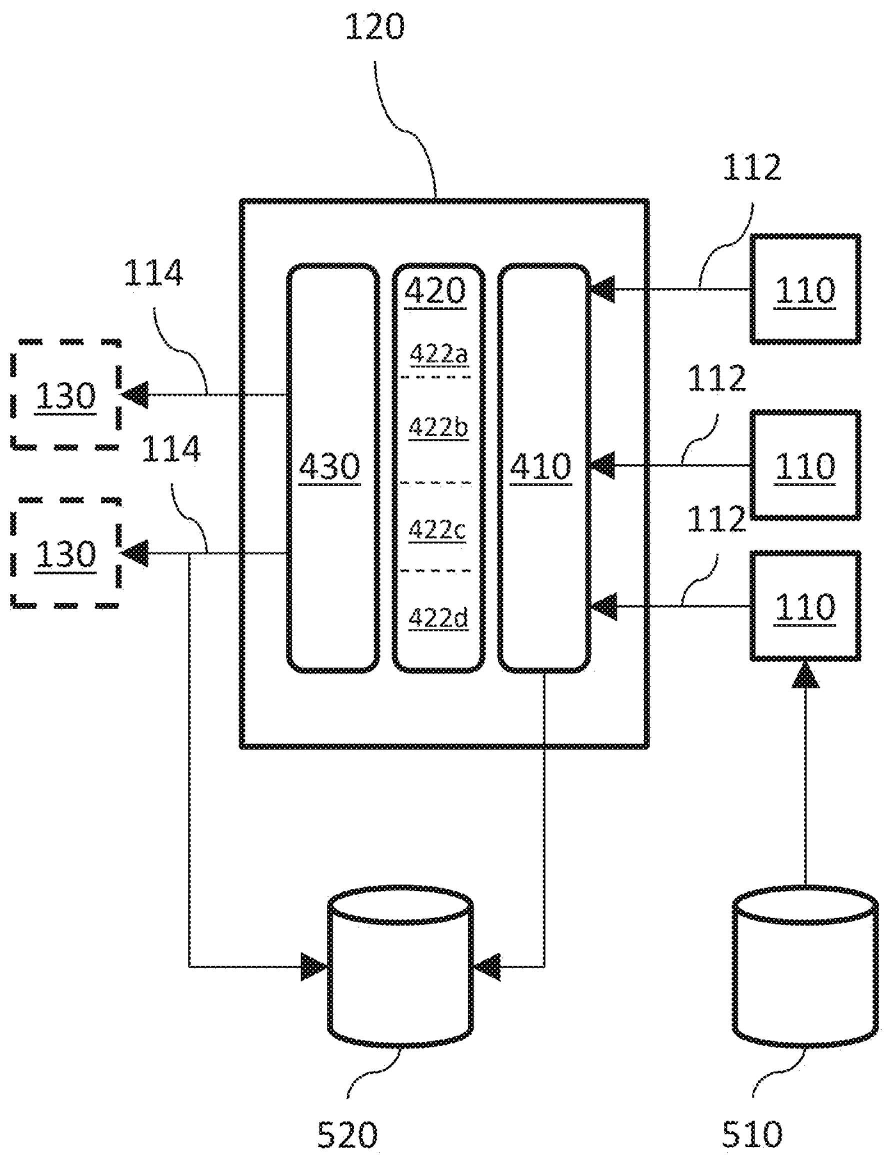
FIG. 5 is a block diagram of an example gateway logging module architecture, in accordance with certain aspects of the present disclosure.

FIG. 5 is a block diagram of an example gateway logging module architecture. Gateway logging module 410 may receive event data packets 112 from various client devices according to stored user preferences and in turn provide event information 114 to gateway messaging bus 420. In one embodiment, the system operations may include pulling, from event-originating application 110, an outstanding task present in a task queue stored in computer memory. The operations may also include providing the outstanding task to gateway logging module 410 as event data packet 112. In other embodiments, the event data packet 112 may be provided (e.g., pushed) by event-originating application 110. Such push embodiments may be utilized to allow the gateway service module to receive event data packet 112 as needed, for example when a new task is generated, a computer fault occurs, etc.

In some embodiments, the pulling and the providing may be based on user preferences stored in first database 510. User preferences may be utilized to determine which kinds of events (and optionally what information about them) are provided to gateway service module 120. For example, the user preferences may include providing, for some users, events based on calendar reminders, but not for computer faults. In contrast, some embodiments may include user preferences (e.g., for computer system support staff) set to receive both types of events.

In some embodiments, the system operations may include obtaining user input, providing user preferences, and storing the user preferences in first database 510. In other embodiments, some user preferences may be set automatically by the system, or by users with higher privileges such as administrators. The user preferences may include opting in or out of receiving notifications and/or assistance for different types of events, event priorities (e.g., only high priority events, high and low priority events, etc.), customizing a level of assistance (e.g., simple notifications, guided decision tree options, fully interactive ML assistance, etc.). Frequency of assistance may also be specified, such as once per event (with no reminders), hourly, daily, or weekly reminders, etc.

In some embodiments, rather than continuous polling of first database 510, user preferences may be queried from first database 510 at a second periodic interval to establish permission to perform the pulling and the providing of the outstanding task. In various embodiments, the second periodic interval may be once per day, twice per day, three times a day, once per week, etc.

In some embodiments, gateway logging module 410 may also be in communication with second database 520 for logging the event information 114 at second database 520. The event status (e.g., in progress, complete, priority, etc.) may also be stored in second database 520 and updated as the event is addressed by the user.

Gateway messaging bus 420 may be a software module that manages the event information collected from gateway logging module 410 and distributed to gateway lookup module 430. Gateway messaging bus 420 may manage event information 114 being distributed to client devices by, for example, deleting, at a third periodic interval, event information 114 stored at gateway messaging bus 420. In some embodiments, the third periodic interval may be four times per day, twice per day, once per day, etc. Such internal system cleanup operations may release processing and memory resources for further operations, once the events have been flagged for deletion by the system. Such flagging may include event resolution (e.g., a user fixing a fault, completing a task deadline, etc.), event provisioning (e.g., pushing event notifications to the appropriate client devices for attention, along with optional re-pushing a certain number of times or until resolved, etc.), event escalation (e.g., making the event notifications more frequent or prominent based on urgency or increased length of time since the event first occurred), etc. Gateway messaging bus 420 may be configured for real-time streaming of a large number of events with high throughput, scalability, and low latency with permanent storage. In some embodiments, this may include introducing partitioning into gateway messaging bus 420 to support multiple users and/or multiple events that may occur at or near the same time. Such an architecture may support one-to-many and many-to-one operations. For example, many events may occur and their corresponding event information may be streamed to a user. Similarly, an event may occur and the event information may be streamed to many users for processing. While four partitions 422*a-d* are depicted, any number of partitions may be implemented in varying embodiments.

Gateway lookup module 430 may act to distribute event information 114 to the appropriate client devices. In some embodiments, gateway lookup module 430 may query the gateway messaging bus 420, for event information 114 at the first periodic interval (e.g., every 10 seconds) and provide event information 114 to event-processing module 130. Gateway lookup module 430 may be configured to detect a user's desktop IP address in real time and the user's desktop IP address may be updated in real time whenever user changes network. For example, the IP address may be changed when a user is working remotely, from an office, from a virtual desktop, etc. Gateway lookup module 430 may be configured to dispatch event notifications to a client device directly using TCP protocol on dedicated port. Gateway lookup module 430 may also update second database 520 upon successful delivery of event information 114.

Figure 6:
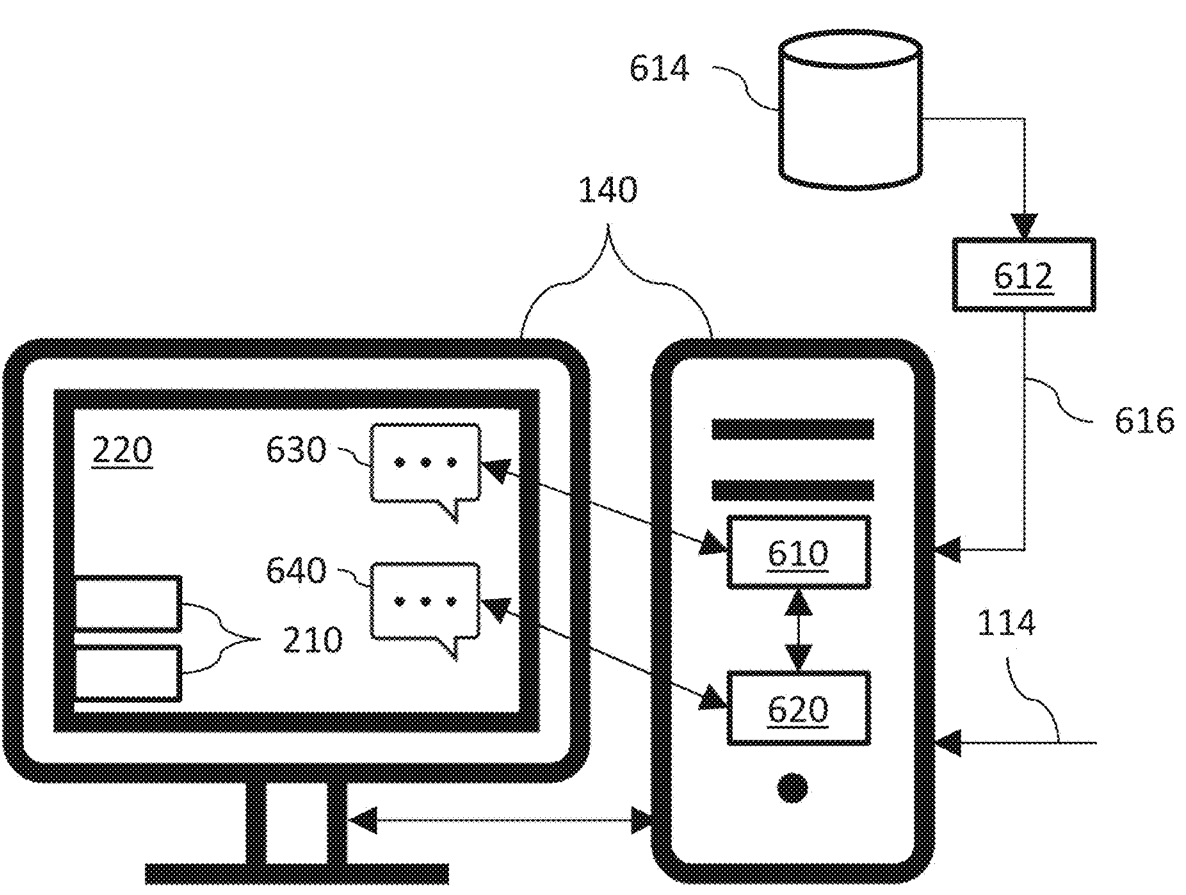
FIG. 6 is a diagram depicting displaying example event notifications at a client device along with ML and/or NLP processing of event information, in accordance with certain aspects of the present disclosure.

FIG. 6 is a diagram depicting displaying event notifications at a client device along with ML and/or NLP processing of event information. In some embodiments, the system (e.g., via client device 140) may provide the event notification and instructions in a predetermined format according to event information 114. The predetermined format may include text, images, etc., for example, as depicted in FIG. 6 by graphical indication 210. Such embodiments may be useful for more simple events, such as reminders, calendar events, etc.

In some embodiments, the disclosed systems may leverage ML and/or NLP processing to provide improved interaction with a user in resolving the event. For example, the operations may include providing event information 114 to machine-learning model 610. Based on the event, gateway service module 120 may provide event information 114 and knowledge base/clues/context to machine-learning model 610. Machine-learning model 610 may then interface with a retrieval augmented generation (RAG) system 612 to supplement the information going into machine-learning model 610 by searching private data 614 (or generally any data store outside of what machine-learning model 610 was trained on) to provide additional contextual information 616 to machine-learning model 610. For example, if the event was related to a system fault, the supplemented data given to machine-learning model 610 could include previously-logged solutions, system information, etc. that would presumably not have been used to train machine-learning model 610 (e.g., being a public or open access generative AI system). The call to initiate RAG may come from gateway service module 120 upon receipt of event data packet 112.

Machine-learning model 610 may determine a summarization of the event, recommended action items, and, in embodiments that incorporate natural language processing module 620, a sentiment. In embodiments where a sentiment is determined, this may include analyzing the event to characterize the event when providing information to the machine learning model. This contextual information may enhance the accuracy of the suggested resolutions. For example, if an event is an error it may have a "negative" sentiment, if an informative event then "informative," if an approval then "positive," or an even can have a "neutral" sentiment if some other sentiments would not be applicable. Gateway service module 120 may interact with machine-learning model 610 through stateless REST protocol to send and receive responses from a user. Machine-learning model 610 can, based at least on event information 114, determine an action a user may take to handle the event. Graphical representation 630 of the action may then be displayed at client device 140. While, in some embodiments, machine-learning model 610 may be located at least partially on client device 140, in other embodiments, machine-learning model 610 may be located on a cloud server or other remote computing system and be in network communication with client device 140.

Some embodiments may integrate natural language processing to interpret user input and provide instructions or parameters to machine-learning model 610. For example, if the event is a software fault, gateway service module 120 may send event information 114 to machine learning model 610 along with initiating generation of contextual information 616 to summarize the fault, determine a recommended remediation, and determine action items. Natural language processing module 620 may also receive text-based input 640 from a user of client device 140 relating to the event. Natural language processing module 620 may process the text-based input by natural language processing module 620 to generate an input for machine-learning model 610. The processing may include, for example, parsing the words in the text string, and, based on contextual clues associated with the event and in the text itself, provide a modified input string to machine-learning model 610 for analysis. Similar to machine-learning model 610, natural language processing module 620 may be located at least partially on the client device or may be located at least partially on a remote computing system.

Figure 7:
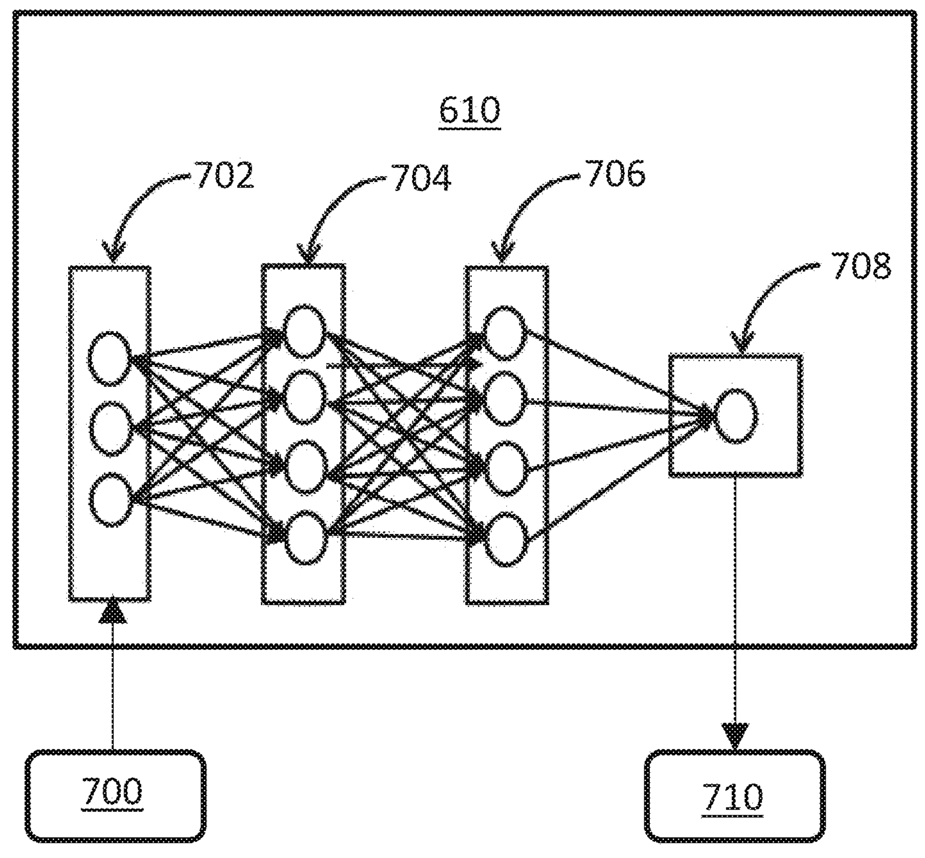
FIG. 7 is a diagram illustrating an example of a machine-learning model, in accordance with certain aspects of the present disclosure.

FIG. 7 is a diagram illustrating an example of a machine-learning model. Machine-learning model 610 illustrates an example of an artificial neural network. Machine-learning model 610 may include input layer 702 and may include one or more hidden layers (e.g., hidden layer 704 and hidden layer 706). Machine-learning model 610 may be based on neural units (or artificial neurons) and vector embeddings to address a semantic search to summarize and identify the resolution to an input event. Event information will be input to machine learning model 610 along with a knowledge base. Each neural unit of machine-learning model 610 may be connected with many other neural units of machine-learning model 610. Such connections may be enforcing or inhibitory in their effect on the activation state of connected neural units. In some embodiments, each individual neural unit may have a summation function, which may combine the values of all of its inputs together. In some embodiments, each connection (or the neural unit itself) may have a threshold function such that the signal must surpass before it propagates to other neural units. In some embodiments, machine-learning model 610 may include multiple layers (e.g., where a signal path traverses from front layers to back layers). In some embodiments, back-propagation techniques may be utilized by machine-learning model 610 where forward stimulation is used to reset weights on the "front" neural units. Machine-learning model 610 may be self-learning and trained, rather than explicitly programmed, and may perform significantly better in certain areas of problem solving, as compared to traditional computer programs. During training, output layer 708 may correspond to an action 710 that will resolve the event, and an input 700 (e.g., event information) known to predict that resolution may be input into input layer 702. During use, the trained neural network may receive input such as event information 114 and generate an action that will resolve the event.

Figure 8:
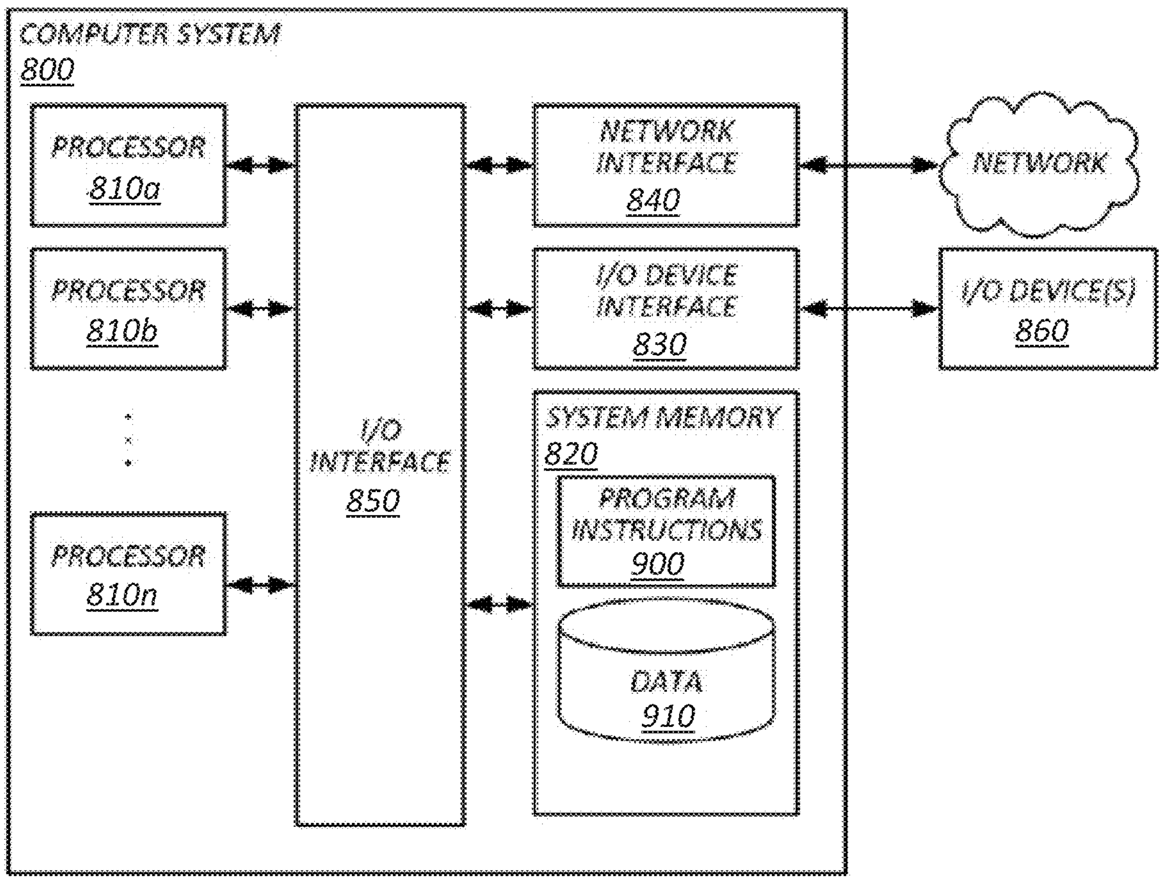
FIG. 8 is a diagram that illustrates a computing system, in accordance with certain aspects of the present disclosure.

Some embodiments may execute the above operations on a computer system, such as the computer system of FIG. 8, which is a diagram that illustrates a computing system 800 in accordance with embodiments of the present techniques. Various portions of systems and methods described herein, may include or be executed on one or more computer systems similar to computing system 800. Further, processes and modules described herein may be executed by one or more processing systems similar to that of computing system 800.

Computing system 800 may include one or more processors (e.g., processors 810*a*-810*n*) coupled to system memory 820, an input/output I/O device interface 830, and a network interface 840 via an input/output (I/O) interface 850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 820). Computing system 800 may be a uni-processor system including one processor (e.g., processor 810*a*), or a multi-processor system including any number of suitable processors (e.g., 810*a*-810*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 800 may include a plurality of computing devices (e.g., distributed computer systems) to implement various processing functions.

In some embodiments, I/O device interface 830 may provide an interface for connection of one or more I/O devices 860 to computer system 800. I/O devices may include devices that receive input (e.g., from a user) or output information (e.g., to a user). I/O devices 860 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 may be connected to computer system 800 through a wired or wireless connection. I/O devices 860 may be connected to computer system 800 from a remote location. I/O devices 860 located on remote computer system, for example, may be connected to computer system 800 via a network and network interface 840.

Network interface 840 may include a network adapter that provides for connection of computer system 800 to a network. Network interface 840 may facilitate data exchange between computer system 800 and other devices connected to the network. Network interface 840 may support wired or wireless communication. The network may include an electronic communication network, such as the Internet, a local area network (LAN), a wide area network (WAN), a cellular communications network, or the like.

System memory 820 may be configured to store program instructions 900 or data 910. Program instructions 900 may be executable by a processor (e.g., one or more of processors 810*a*-810*n*) to implement one or more embodiments of the present techniques. Program instructions 900 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 820 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 820 may include a non-transitory computer readable storage medium that may have program instructions stored thereon that are executable by a computer processor (e.g., one or more of processors 810*a*-810*n*) to cause the subject matter and the functional operations described herein. A memory (e.g., system memory 820) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 850 may be configured to coordinate I/O traffic between processors 810*a*-810*n*, system memory 820, network interface 840, I/O devices 860, and/or other peripheral devices. I/O interface 850 may perform protocol, timing, or other data transformations to convert data signals from one component (e.g., system memory 820) into a format suitable for use by another component (e.g., processors 810*a*-810*n*). I/O interface 850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 800 or multiple computer systems 800 configured to host different portions or instances of embodiments. Multiple computer systems 800 may provide for parallel or sequential processing/execution of one or more portions of the techniques described herein.

Those skilled in the art will appreciate that computer system 800 is merely illustrative and is not intended to limit the scope of the techniques described herein. Computer system 800 may include any combination of devices or software that may perform or otherwise provide for the performance of the techniques described herein. For example, computer system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In the following, further features, characteristics, and exemplary technical solutions of the present disclosure will be described in terms of items that may be optionally claimed in any combination:

Item 1: A method for implementation by at least one programmable processor, the method comprising: receiving, at a gateway service module from an event-originating application, an event data packet comprising event information about an event; providing, by the gateway service module to an event-processing module, the event information; generating, by the event-processing module, an event notification based at least on the event information; and initiating, by the gateway service module, a push notification to a client device that includes the event notification and instructions to display the event notification at the client device.

Item 2: A method as in any preceding Item, wherein the event-originating application is a ticketing service, a scheduling service, an application datacenter failover service, an event management service, or a fault monitoring service.

Item 3: A method as in any preceding Item, wherein the event information includes one or more of an outstanding request, a scheduled activity, or a hardware or software fault.

Item 4: A method as in any preceding Item, the method further comprising displaying of the event notification at the client device by generating a graphical indication on a screen of the client device that is visible to a user.

Item 5: A method as in any preceding Item, the gateway service module comprising a gateway logging module, a gateway messaging bus, and a gateway lookup module, the method further comprising: providing, from the event-originating application to the gateway logging module, the event data packet; providing, to the gateway messaging bus from the gateway logging module, the event information; and providing, by the gateway messaging bus to the gateway lookup module, the event information at a first periodic interval.

Item 6: A method as in any preceding Item, wherein the first periodic interval is 10 seconds.

Item 7: A method as in any preceding Item, the method further comprising: pulling, from the event-originating application, an outstanding task present in a task queue stored in computer memory; and providing the outstanding task to the gateway logging module as an event data packet.

Item 8: A method as in any preceding Item, wherein the pulling and the providing is based on user preferences stored in a first database.

Item 9: A method as in any preceding Item, the method further comprising obtaining user input providing user preferences and storing the user preferences in the first database.

Item 10: A method as in any preceding Item, wherein the user preferences are queried from the first database at a second periodic interval to establish permission to perform the pulling and the providing of the outstanding task.

Item 11: A method as in any preceding Item, wherein the second periodic interval is three times a day.

Item 12: A method as in any preceding Item, the method further comprising logging the event information at a second database.

Item 13: A method as in any preceding Item, the method further comprising deleting, at a third periodic interval, the event information stored at the gateway messaging bus.

Item 14: A method as in any preceding Item, wherein the third periodic interval is twice per day.

Item 15: A method as in any preceding Item, the method further comprising: querying, by the gateway lookup module to the gateway messaging bus, for the event information at the first periodic interval; and providing the event information to the event-processing module.

Item 16: A method as in any preceding Item, the method further comprising providing the event notification and instructions in a predetermined format according to the event information.

Item 17: A method as in any preceding Item, the method further comprising: providing the event information to a machine-learning model; determining, by the machine-learning model and based at least on the event information, an action a user may take to handle the event; and displaying, at the client device, a graphical representation of the action.

Item 18: A method as in any preceding Item, wherein the machine-learning model is located at least partially on the client device.

Item 19: A method as in any preceding Item, the method further comprising: receiving text-based input from a user of the client device relating to the event; and processing the text-based input by a natural language processing module to generate an input for the machine-learning model.

Item 20: A method as in any preceding Item, wherein the natural language processing module is located at least partially on the client device.

Item 21: A system for providing event-based notifications to client devices, the system comprising: memory storing computer program instructions; and one or more processors configured to execute the computer program instructions to cause operations as in any of the above methods.

Item 22: A non-transitory, machine-readable medium storing instructions which, when executed by at least one programmable processor, cause operations as in any of the above methods.

The present disclosure contemplates that the calculations disclosed in the embodiments herein may be performed in a number of ways, applying the same concepts taught herein, and that such calculations are equivalent to the embodiments disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. The implementations described above may be directed to various combinations and subcombinations of the disclosed features and/or combinations and subcombinations of further features noted above. Furthermore, above-described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A system for providing event-based notifications to client devices, the system comprising:

memory storing computer program instructions; and one or more processors configured to execute the computer program instructions to cause operations comprising:

receiving, at a gateway service module from an event-originating application, an event data packet comprising event information about an event;

providing, by the gateway service module to an event-processing module, the event information;

generating, by the event-processing module, an event notification based at least on the event information;

initiating, by the gateway service module, a push notification to a client device that includes the event notification and instructions to display the event notification at the client device;

pulling, from the event-originating application, an outstanding task present in a task queue stored in computer memory; and providing the outstanding task to the gateway service module as an event data packet;

wherein the pulling and the providing are based on user preferences stored in a first database, and wherein the user preferences are queried from the first database at a second periodic interval to establish permission to perform the pulling and the providing of the outstanding task.

2. The system of claim 1, wherein the event-originating application is a ticketing service, a scheduling service, an application datacenter failover service, an event management service, or a fault monitoring service.

3. The system of claim 1, wherein the event information includes one or more of an outstanding request, a scheduled activity, or a hardware or software fault.

4. The system of claim 1, the operations further comprising displaying of the event notification at the client device by generating a graphical indication on a screen of the client device that is visible to a user.

5. The system of claim 1, the gateway service module comprising a gateway logging module, a gateway messaging bus, and a gateway lookup module, the operations further comprising:

providing, from the event-originating application to the gateway logging module, the event data packet;

providing, to the gateway messaging bus from the gateway logging module, the event information; and providing, by the gateway messaging bus to the gateway lookup module, the event information at a first periodic interval.

6. The system of claim 5, wherein the first periodic interval is 10 seconds.

7. The system of claim 5, the operations further comprising logging the event information at a second database.

8. The system of claim 5, the operations further comprising deleting, at a third periodic interval, the event information stored at the gateway messaging bus.

9. The system of claim 8, wherein the third periodic interval is twice per day.

10. The system of claim 5, the operations further comprising:

querying, by the gateway lookup module to the gateway messaging bus, for the event information at the first periodic interval; and providing the event information to the event-processing module.

11. The system of claim 1, the operations further comprising obtaining user input providing user preferences and storing the user preferences in the first database.

12. The system of claim 1, wherein the second periodic interval is three times a day.

13. The system of claim 1, the operations further comprising providing the event notification and instructions in a predetermined format according to the event information.

14. The system of claim 1, the operations further comprising:

providing the event information to a machine-learning model;

determining, by the machine-learning model and based at least on the event information, an action a user may take to handle the event; and displaying, at the client device, a graphical representation of the action.

15. The system of claim 14, wherein the machine-learning model is located at least partially on the client device.

16. The system of claim 14, the operations further comprising:

receiving text-based input from a user of the client device relating to the event; and processing the text-based input by a natural language processing module to generate an input for the machine-learning model.

17. The system of claim 16, wherein the natural language processing module is located at least partially on the client device.

18. A non-transitory, machine-readable medium storing instructions which, when executed by at least one programmable processor, cause operations comprising:

receiving, at a gateway service module from an event-originating application, an event data packet comprising event information about an event;

providing, by the gateway service module to an event-processing module, the event information;

generating, by the event-processing module, an event notification based at least on the event information;

initiating, by the gateway service module, a push notification to a client device that includes the event notification and instructions to display the event notification at the client device;

pulling, from the event-originating application, an outstanding task present in a task queue stored in computer memory; and providing the outstanding task to the gateway service module as an event data packet;

wherein the pulling and the providing are based on user preferences stored in a first database, and wherein the user preferences are queried from the first database at a second periodic interval to establish permission to perform the pulling and the providing of the outstanding task.

19. A method for implementation by at least one programmable processor, the method comprising:

receiving, at a gateway service module from an event-originating application, an event data packet comprising event information about an event;

providing, by the gateway service module to an event-processing module, the event information;

generating, by the event-processing module, an event notification based at least on the event information;

initiating, by the gateway service module, a push notification to a client device that includes the event notification and instructions to display the event notification at the client device;

pulling, from the event-originating application, an outstanding task present in a task queue stored in computer memory; and providing the outstanding task to the gateway service module as an event data packet;

wherein the pulling and the providing are based on user preferences stored in a first database, and wherein the user preferences are queried from the first database at a second periodic interval to establish permission to perform the pulling and the providing of the outstanding task.

* * * * *